United States Patent [19]

Kashiwaba

[11] Patent Number: 4,534,518

[45] Date of Patent: Aug. 13, 1985

[54] AUTOMATIC LABEL WINDER

[75] Inventor: Tadao Kashiwaba, Kitakami, Japan

[73] Assignee: Kabushiki Kaisha Sato, Japan

[21] Appl. No.: 642,830

[22] Filed: Aug. 21, 1984

[30] Foreign Application Priority Data

Aug. 24, 1983 [JP] Japan ................................ 58-153161

[51] Int. Cl.$^3$ ........................ B23P 23/00; B65H 19/20

[52] U.S. Cl. .................................................. 242/56 R

[58] Field of Search .......................... 242/55, 56 R, 57

[56] References Cited

U.S. PATENT DOCUMENTS 3,127,122 3/1964 Roshkind .......................... 242/57 X 4,114,252 9/1978 Kon et al. .......................... 242/56 R

*Primary Examiner*—Stuart S. Levy

*Assistant Examiner*—Lloyd D. Doigan

*Attorney, Agent, or Firm*—Ostrolenk, Faber, Gerb & Soffen

[57] ABSTRACT

An automatic label winder automatically winds a label web imprinted with bar codes or other information on a label cassette. The winder includes a turntable on which the label cassette may be mounted. A winding shaft is disposed at the center of the turntable for rotating the take-up core of the label cassette. A cutter mechanism is carried on the turntable for cutting the label web after a predetermined length of label web has been wound on the cassette. The cutting mechanism is actuated by turning the turntable. The turntable alternates between a first position which allows the label web to be rolled onto the cassette and other positions which activate the cutting mechanism and which allow the beginning of a label web to be guided into the cassette. Through an optical sensor, in conjunction with a hole in the body of the turntable, the rotational position of the turntable is determined and a turntable stop signal is generated.

23 Claims, 15 Drawing Figures

AUTOMATIC LABEL WINDER

BACKGROUND OF THE INVENTION

The present invention relates to an automatic label winder and, more particularly, to an automatic label winder which is capable of automatically winding a label web upon a cassette. The cassette itself can be removably mounted in a label applicator so that the printed labels of the label web may be applied to various goods.

In the prior art, there is known a portable label applicator for printing labels, which are temporarily adhered in series to a web of backing paper, and for peeling the printed labels from the backing paper and then applying them to various articles. Such label applicators are called "hand labelers" and they are used widely in supermarkets and other similar establishments to mark goods. A hand labeler of this type is used for applying labels to the commodities mainly at sales counters where the commodities are stored. As a result of the widespread use of bar code labels in recent years, it has become necessary to generate labels which include bar codes. However, the bar codes cannot be printed by means of the simple printing head attached to the hand labeler of the prior art with the required precision which would allow the labels to be correctly read out by means of an optical reader.

The printing head for bar codes must necessarily be made larger than that used for ordinary letters because of the comparative sizes of bar codes and letters. Consequently, the hand labeler becomes very large and heavy if provision for printing bar codes is made in the hand labeler itself. This increases the difficulty of handling the hand labeler and results in operator fatigue. Moreover, the bar codes must include check digits and it is difficult to incorporate the additional function of automatically computing the check digits in the ordinarily small labelers of the prior art. Therefore, the check digits have to be separately computed and entered into the printing head so that the use of the hand labeler together with the bar codes having the check digits becomes inconvenient.

In view of this inconvenience, a system has been proposed in which first a label web is printed and then the label web is wound upon a cassette. The cassette with its preprinted labels is then loaded into a label applicator. With this system, label printing and application can be carried out precisely and efficiently. However in the prior art the operation of winding the label web upon the cassette is a troublesome manual operation.

SUMMARY OF THE INVENTION

It is an object of the present invention to provide an automatic label winder which is capable of automatically winding a label web upon a cassette.

The automatic label winder according to the present invention is desigend to automatically wind the label web, which contains the printed labels on a cassette which can be removably mounted on a turntable which is started by a start button. The label winder also operates to automatically cut off a label web strip of predetermined length.

According to one embodiment of the present invention, there is provided an automatic label winder for automatically winding a preprinted label web on the take-up core of the label cassette. The label winder includes: a rotatable turntable; means for relasably securing a label cassette to said turntable in such manner that said label cassette rotates with said turntable when it is secured thereto means for guiding a label web into said cassette when said cassette is secured to said turntable means for rotating a take-up core of said cassette when said cassette is secured to said turntable and after said label web has been guided into said cassette: means for rotating said turntable after said label web has been wound about said core; and means responsive to said rotation of said turntable for cutting said label web.

BRIEF DESCRIPTION OF THE DRAWINGS

Other objects features and advantages of the present invention will be described below with reference to the accompanying drawings, in which:

FIG. 1 is a side elevational view showing a label cassette which is used with the automatic label winder.

FIG. 2 is a section taken along lines II—II of FIG. 1.

FIG. 3 is a longitudinal sectional side elevation view showing the label cassette of FIG. 1.

FIG. 4 is a top plane view showing an essential portion of the automatic label winder in the state where it is loaded with the label cassette.

FIG. 5 is a sectional view showing a drive mechanism including a turntable.

FIG. 6 is a longitudinal sectional side elevation view showing a portion of the drive mechanism.

FIG. 7 is a top plane view showing the automatic label winder immediately before a label web is cut.

FIG. 8 is similar to FIG. 7 but shows an essential portion of the automatic label winder when the label winding operation is ended.

FIGS. 9 and 10 are longitudinal sectional side elevation views showing the states of the cutter mechanism before and after its operation.

FIG. 11 is a side elevation showing a hook member to be used with the automatic label winder.

FIGS. 12 to 14 show a label applicator to be used with the automatic label winder shown in FIGS. 1 to 11.

FIG. 12 is a perspective view of the label applicator.

FIG. 13 is a longitudinal sectional side elevation view of the label applicator.

FIG. 14 is a top plane view of the applicator.

DESCRIPTION OF THE PREFERRED EMBODIMENT

The present invention will be described in detail below in connection with one embodiment thereof with reference to the accompanying drawings.

Figure 2:
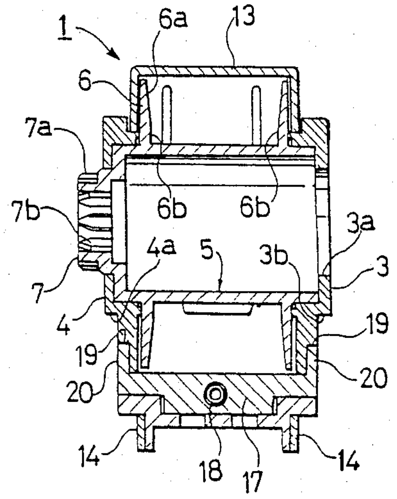
Figure 3:
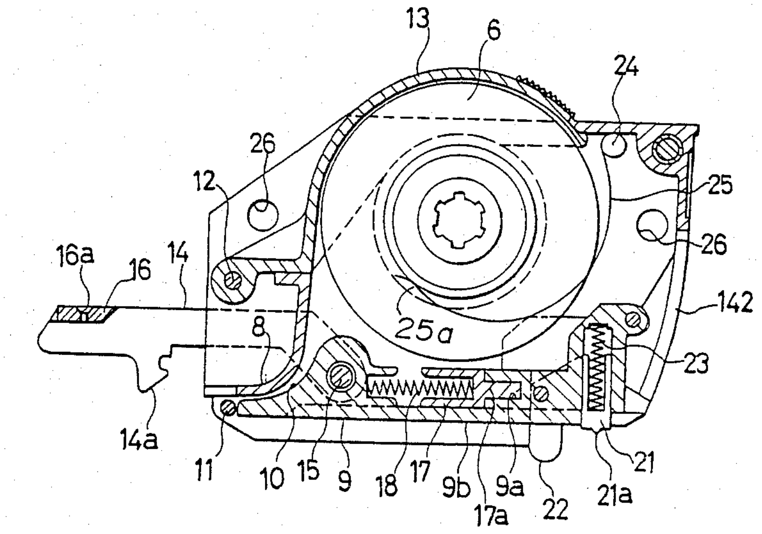
Figure 9:
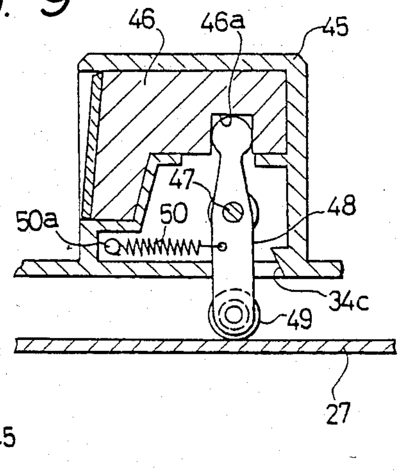

First, the structure of a cassette 1 will be described with reference FIGS. 1 to 3. The cassette 1 includes a casing 2 which forms a hollow frame. A take-up core 5 is rotatably supported between the right and left side plates 3 and 4 of the casing 2. The take-up core 5 is a cylinder having a predetermined diameter and it is provided at both its ends with flanges 6 which are held in contact with the inner sides of side plates 3 and 4. The inner sides of the flanges 6 are tapered radially outwardly to the circumferential edges thereof as indicated at 6*a* and the roots of the flanges 6 extending a straight Below the blade 46 there is disposed an arm 48 which is hinged by a hinging pin 47 anchored at the casing 45. The arm 48 has its upper end fitted in the notch 46*a*, which is formed in the lower side of the aforementioned blade 46, and its lower end extending through the turntable 34 and supports a roller 49 at its lower extremity. Midway of the arm 48, i.e. between the hinging pin 47 and the roller 49 there is fixed one end of a spring 50 which has its other end fixed on a pin 50*a* anchored in the casing 45 to bias the arm 48 to swing clockwise as viewed in FIG. 9. As a result, the roller 49 at the lower end of the arm 48 lightly contacts the base 27 and the arm 48 is swung clockwise hy the tension of the spring 50 so that it is oriented toward an upright position, a shown in FIG. 9. In this state the blade 46 is retracted into the casing 45 and its edge does not protrude from the casing 45. On the other hand when the arm 48 is swung counter-clockwise around the hinging pin 47 as a result of a swinging force in the counter-clockwise direction, the spring 50 is extended and the blade 46 protrudes from the casing 45. The arm 48 is extended, as described above, through the action of a step 51 (FIG. 10) which is formed on a portion of the outer periphery of the base 27. The step 51 has a sloping section which is indicated at 51*a*. The step 51 is formed adjacently to a later-described platen 53 located below the turntable 34 and on the turning locus of the roller 49.

Figure 4:
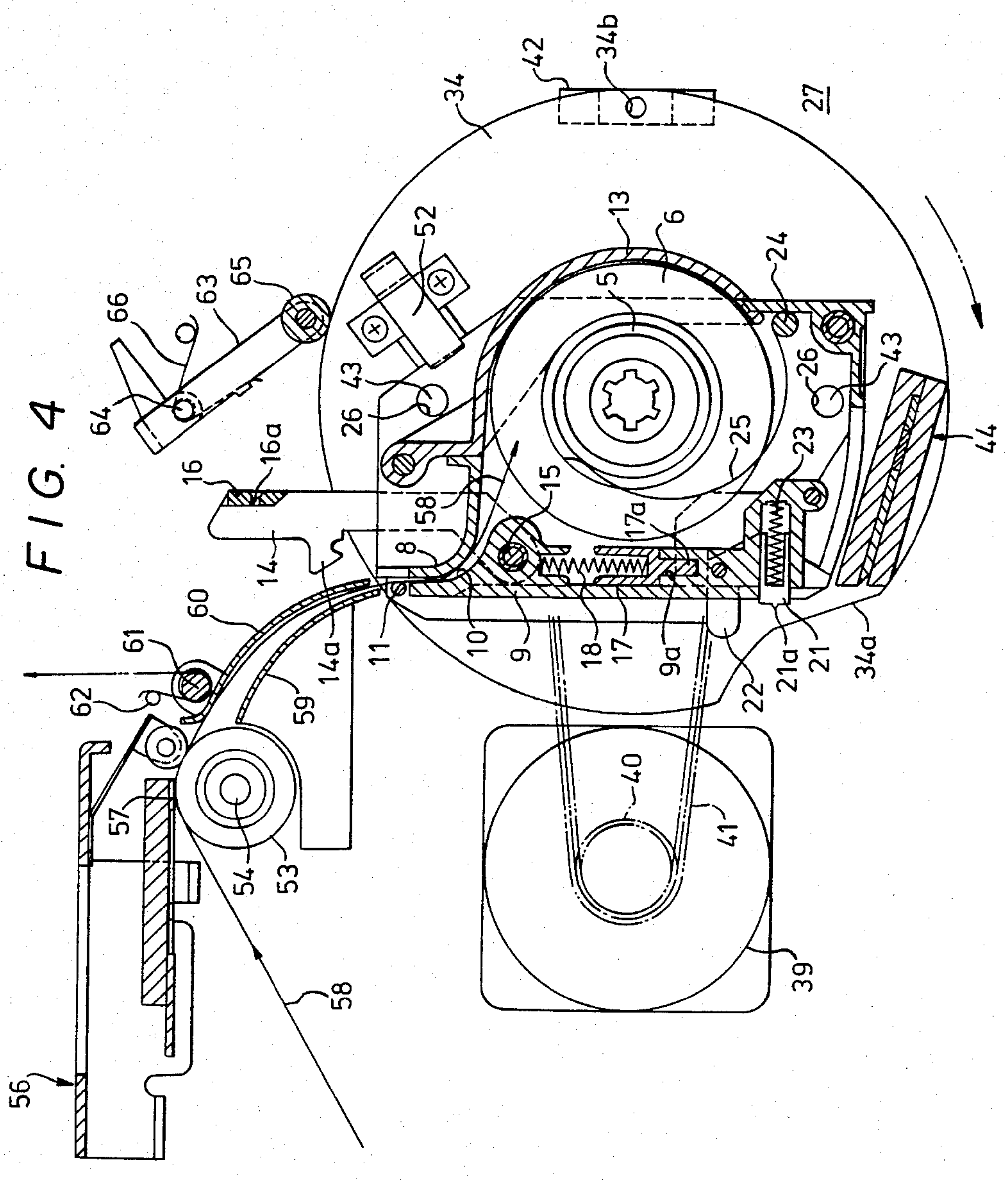
Figure 5:
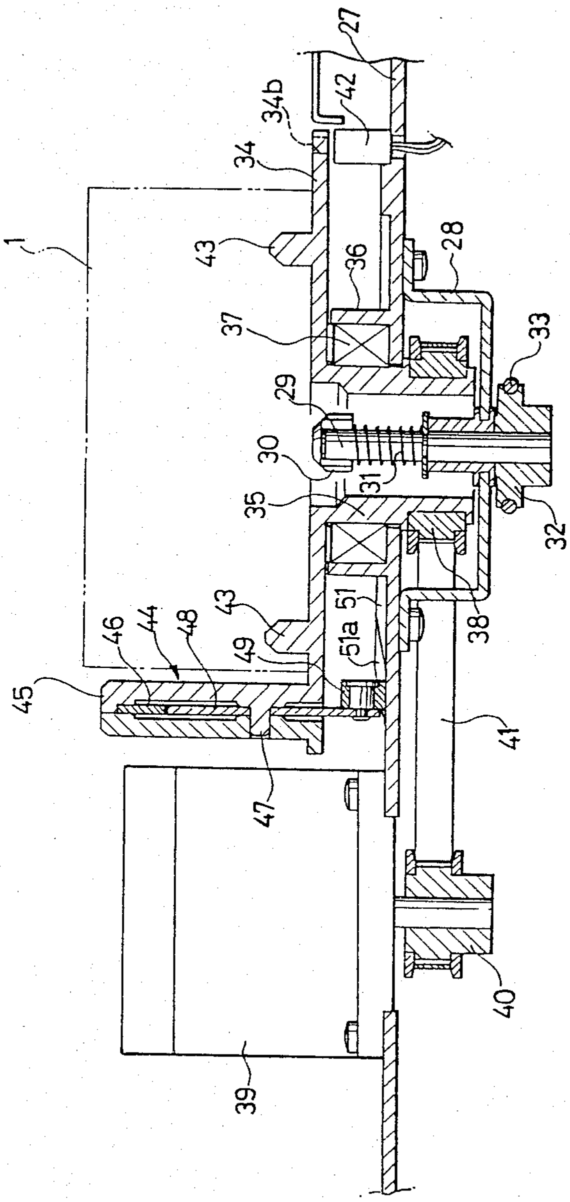
Figure 7:
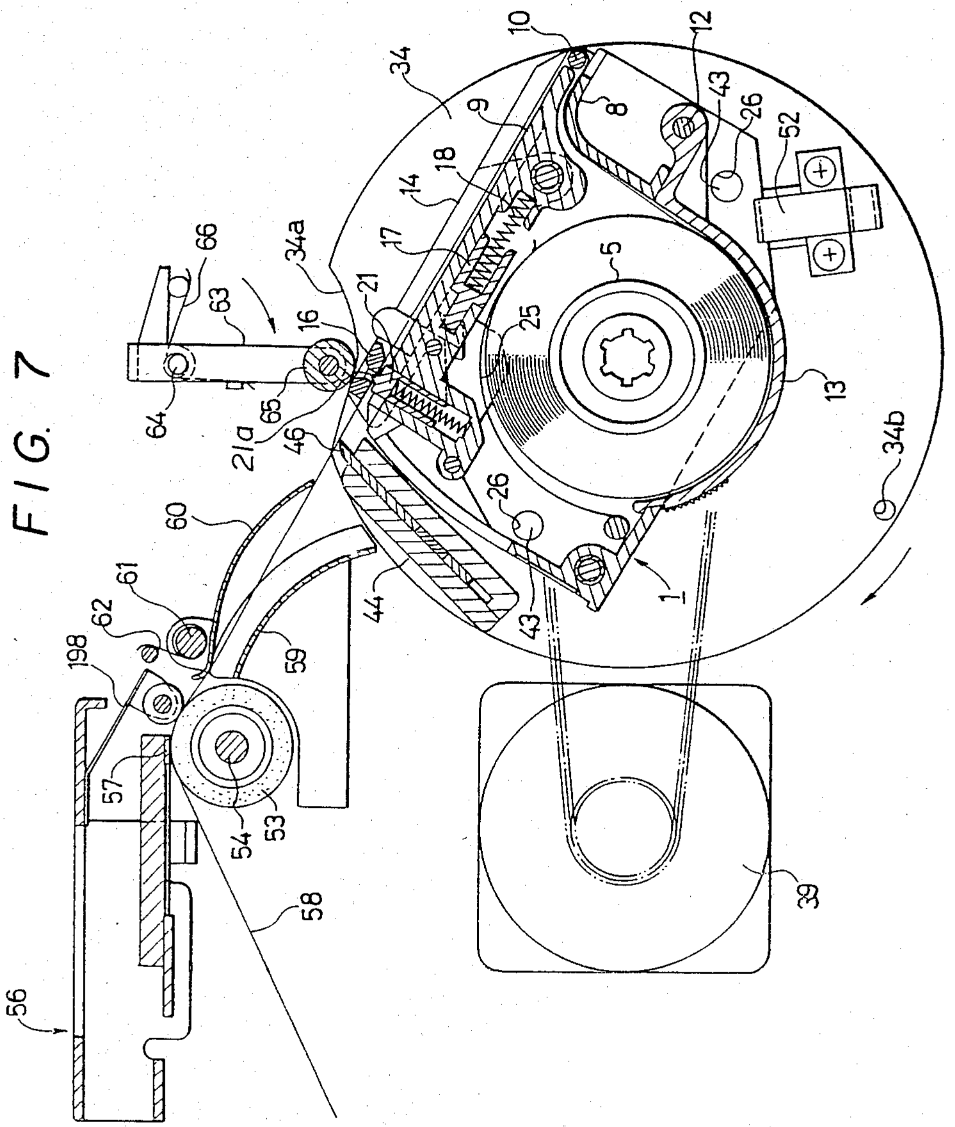
Figure 11:
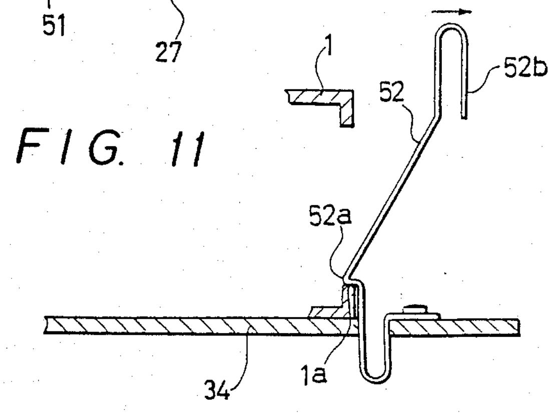

On the turntable 34, as best shown in FIGS. 4 and 7 there is mounted a hook member 52 which serves to hold the cassette 1 on the table 54. The hook member 52 is defined by a leaf spring, as shown in FIG. 11 and includes a hooked portion 52*a* having a right-angled triangular shape. The hooked portion 52*a* is fitted in a recess 1*a* which is formed in the side edge of the cassette 1 when the cassette 1 is coupled to the turntable 54. Moreover, the hook member 52 is bent at an angle from the cassette 1 upward from the hooked portion 52*a* and is formed with a pinch 52*b* at its upper end. The lower end of the hook member 52 is fixed on the turntable 34.

Figure 6:
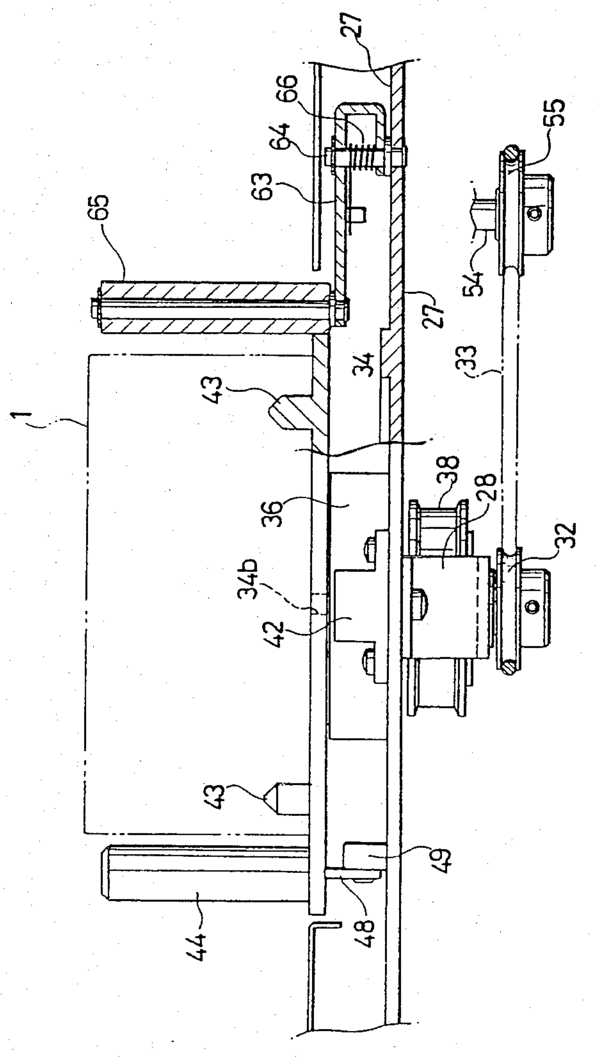

On the base 27 (FIG. 6) there is rotatably carried through the platen shaft 54 a platen which is positioned apart from the turntable 34. The platen shaft 54 extends downward through the base 27 to reach through its lower end a pulley 55. A belt 33 is provided between the pulley 55 and the aforementioned pulley 32 so that the two pulleys 32 and 55 rotate in synchronism.

A recording head 56 (FIG. 4) is mounted on the base 27 in the vicinity of the platen 53. The recording head 56 has a thermal head 57 and employs a heat-sensitive transfer ink ribbon described below with reference to FIG. 15 for printing predetermined indicia upon the labels, which are temporarily adhered to the label web 58 which is guided between the thermal head 57 and the platen 53.

Between the platen 53 and the turntable 34, there is located a stationary guide plate 59 and a moving guide plate 60. These two guide plates 52 and 60 are curved and arranged so that the spacing between them is greater at the side of the platen 53 and smaller at the side of the turntable 34 as seen in FIG. 4. The guide plate 59 is fixed on the base 27, whereas the moving guide plate 60 is hinged at its end portion to the side of the platen 53 by means of a hinging pin 61. In an alternate embodiment, the two guide plates 59 and 60 may be made movable or stationary together. A torsion coil spring 62 is mounted on the hinging pin 61 so that the moving guide plate 60 is biased to swing in a clockwise direction.

On the base 27, there is mounted a set lever 63 which is located near the turntable 34 in a position to control the swing arm 14. One end of the set lever 63 is swingably mounted on the base 27 by means of a hinging pin 64 and its other end supports a roller 65 in an upright position. On the hinging pin 64 there is mounted a torsion coil spring 66 which biases the set lever 63 to swing clockwise, as viewed in FIG. 4. As a result the roller 65 is always biased into contact with the circumference of the turntable 34. The lever 63, roller 65 and spring 66 together define a cam follower which ride along a cam surface defined by the circumference of turntable 34.

The operation of the embodiment just described will now be explained.

Before the cassette 1 is placed on the turntable 34 the turntable 34 is stopped in a position where the hole 34 is detected by the sensor 42 i.e. the hole 34*b* is positioned above the sensor 42. In this position, shown in FIG. 4, the motor 39 and the hole 34*b* are diametrically opposed so that the notch 34*a* of the turntable 34 is located near the motor 39. On the other hand the set lever 63 is held in contact with the circumference of the turntable 34 and is located at the side of the platen 53 with reference to a straight line joining the motor 39 and the hole 34*b*. In this orientation, the cassette 1 is inserted onto the turntable 34.

Figure 1:
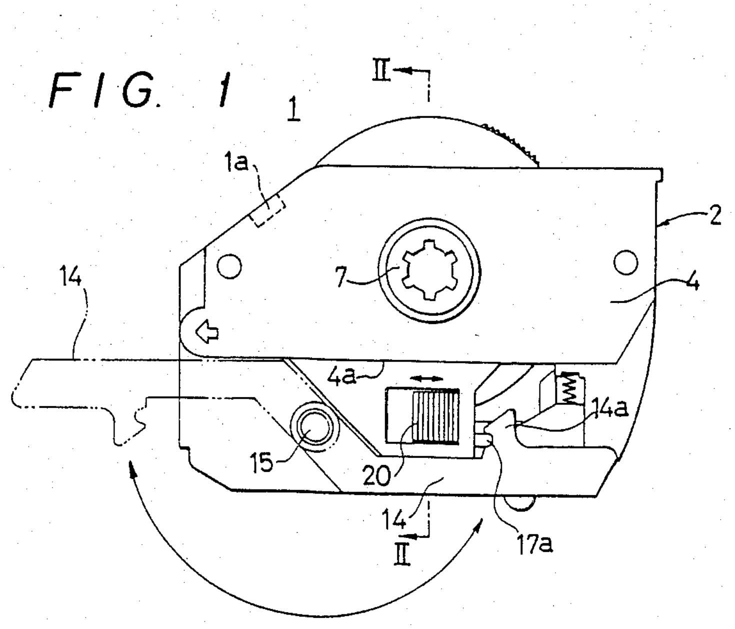
FIGS. 1 to 11 shown an automatic label winder according to one embodiment of the present invention.

Prior to inserting the cassette 1 into the winder the knobs 20 (FIGS. 2 and 3) are moved against the elastic force of the spring 18 to retract the protrusion 17*a* and thereby disengage the hook 14*a* (FIG. 1) of the swing arm 14 from the protrusion 17*a* so that the swing arm 14 is swung clockwise of FIG. 1 about the hinging pin 15. The swing arm 14 is swung approximatey 180 degrees at which time its midsection contacts the stepped portions 3*b* and 4*a* of the side plates 3 and 4. In this orientation, the roller 49 at the lower end of the arm 48 of the cutter mechanism 44 is not in contact with the step 51 formed on the base 27 but is on the remaining portion of the base 27 so that the arm 48 is pulled by the spring 50 into the position illustrated in FIG. 9. As a result, the arm 48 assumes an upright position so that the blade 46 is held inside the casing 45. After the above steps have been carried out, the cassette 1 is mounted on the turntable 34. At this time the side of the cassette 1 and the boss 7 is placed upon the turntable 34 to urge the winding gear 30 of the winding shaft 29 into meshing engagement with the internal gear 7*b* of the boss 7 and to fit the guide pins 43, which are formed to protrude from the turntable 34, in the positioning through holes 26. In the cassette loading operation, the pinch 52*b* (FIG. 11) at the upper end of the hook member 52 is pinched to deform the hook member 52 in a direction away from the cassette 1. After the cassette 1 is set on the turntable 34, the pinch 52*b* is released to bring the hooked portion 52*a* into engagement with the recess 1*a* formed in the side of the cassette 1 as shown in FIG. 11, so that the cassette 1 is held in the state where it is locked on the turntable 34. When loading the cassette 1, the set lever 63 is held in a position where it is turned counter-clockwise around the hinging pin 64 as viewed in FIG. 4, so that the roller 65 is held in contact with the circumference of the turntable 34 by the force of the torsion coil spring 66. When the cassette 1 is mounted on the turntable 34 in the manner described above, the open end of the arcuate guide groove 10 of the guide portion 8 is positioned, as shown in FIG. 4 to substantially face the leading ends of the stationary guide plate 59 and the moving guide plate 60.

Thereafter, the keyboard of the printer is operated to input indicia which are to be recorded on the labels adhered to the label web 58. Upon pressing a start button a motor (not shown) is activated to rotate the platen 53. Since the pulley 55 is fixed on the lower end of the shaft 54 of the platen 53 and since the belt 33 is made to run under tension between that pulley 55 and the pulley 32 fixed on the lower end of the winding shaft 29 the shaft 29 starts rotating to turn the take-up core 5 through the boss 7. Consequently the label web 58 and the ink ribbon are guided to the passage between the platen 53 and the thermal head 57. At the thermal head 57 the labels on the label web 58 are printed with predetermined information.

After the recording operation the label web 58 is separated from the ink ribbon and is guided into the guide passage which is defined by the stationary and moving guide plates 59 and 60. Owing to the fact that the label web 58 is somewhat rigid it will pass the leading ends of the stationary and moving guide plates 59 and 60, and will allow itself to be threaded into the guide groove 10 of the guide portion 8. Since the guide groove 10 is formed generally in a shape of a fish hook as is shown in FIG. 4, the leading end of the label web 58 is guided into the space of the cassette 1 to advance along the inner periphery of the arcuate cover 13 until it is guided onto the take-up core 5 along the arcuate leaf spring 25 which operates as a guide plate. Since the right and left flanges 6 of the take-up core 5 are formed with the straight portions **6*b* at their legs the leading end of the label web 58 is temporarily clamped between the straight portions 6*b* and 6*b* and allowed to adhere to the circumference of the take-up core 5, while being pushed against the core by the leading end of the leaf spring 25 as the take-up core 5 rotates. After a predetermined length of web is wound upon the take-up core 5 (compare FIGS. 4 and 7) the motor driving the platen 53 is stopped to end the winding operation of the label web 58**.

The end of the winding operation is detected by a control circuit (not shown) which starts to drive the motor 39. When the motor 39 starts turning, the turntable 34 is rotated clockwise, as viewed in FIG. 4, by the belt 41. Simultaneously the cassette 1, which is positioned on the turntable 34 by means of the guide pins 43 and retained by the hook member 52 begins rotating. As a result the swing arm 14 which is held in its open state and protrudes to the outside of the turntable 34, begins to contact the set lever 63 and starts to swing counterclockwise around the hinging pin 15.

During the rotation of the cassette 1, the take-up core 5 is locked on the winding shaft 29 and does not rotate with the turntable 34. Since the label web 58 is still uncut however, the distance between the turning pin 11 in the vicinity of the guide portion 8 and the platen 53 changes so that an additional predetermined length of the label web 58 is pulled onto the bottom edge 9 of the cassette 1. As a result, the moving guide plate 60 is swung in the direction away from the stationary guide plate 59 as shown in FIG. 7, against the torsional force of the torsion coil spring 62. As the cassette 1 continues to rotate, the roller 65 of the set lever 63 (which together operates as a cam follower) will fall into the notch **34*a* formed along the outer periphery of the turntable 34 (which outer periphery operates as a com surface) and push the swing arm 14 against the bottom of the cassette 1 as shown in FIG. 7. At this time, the upper end portion of the hook 14*a* of the swing arm 14 rides over the protrusion 17*a* of the slide member 17 to slightly retract the slide member 17, and the hook 14*a* and the protrusion 17*a* then come into engagement to bring the swing arm 14 into its locked state shown in FIG. 1. In this position, the backing paper holder cooperates with the joint member 16 to lock the web 58 in place with respect to the cassette 1. More particularly the point 21*a* of the backing paper holder 21 pierces the label web 58 and extends into the small hole 16*a* which is formed in the joint member 16. Thus, the label web 58 is retained in the cassette 1**.

Figure 10:
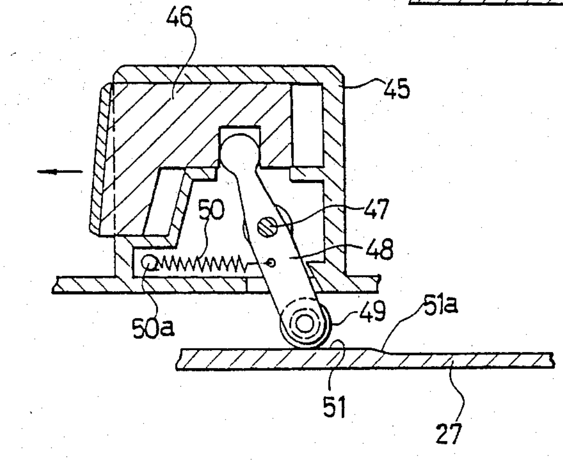

Immediately after the label web 58 is secured to the cassette 1 in the manner described, the roller 49 at the lower end of the arm 48 of the cutter mechanism 44 rides over the step 51 on the base 27 as shown in FIG. 10. The arm 48 and roller 49 operate as a cam follower which rides along a cam surface formed on base 27 as the turntable 34 rotates, the step 51 forms part of the cam surface and cooperates with the cam follower to move the cutting edge of blade 46 out of the blade housing 45. More particularly as the roller 49 comes into contact with the step 51 the arm 48 swings counterclockwise as viewed in FIG. 10 around the hinging pin 47 to stretch the spring 50 and the blade 46 push out from the casing 45. If, in this state, the turntable 34 continues to rotate the edge of the blade 46 cuts the label web 58 which is held under tension between the backing paper holder 21 and the platen 53. During the time that the turntable 34 is rotated about 180 degrees in the manner described above the swing arm 14 is closed to retain the label web 58 on the backing paper holder 21 so that the end portion of the label web 58 is automatically cut off by the action of the cutter mechanism 44. After the cutting operation of the label web 58 is completed in the aforementioned manner the turntable 34 continues rotating until the hole **34*b* aligns with the sensor 42 which indicate the turntable 34 has returned to its initial location. The motor 39** is then disabled.

Figure 8:
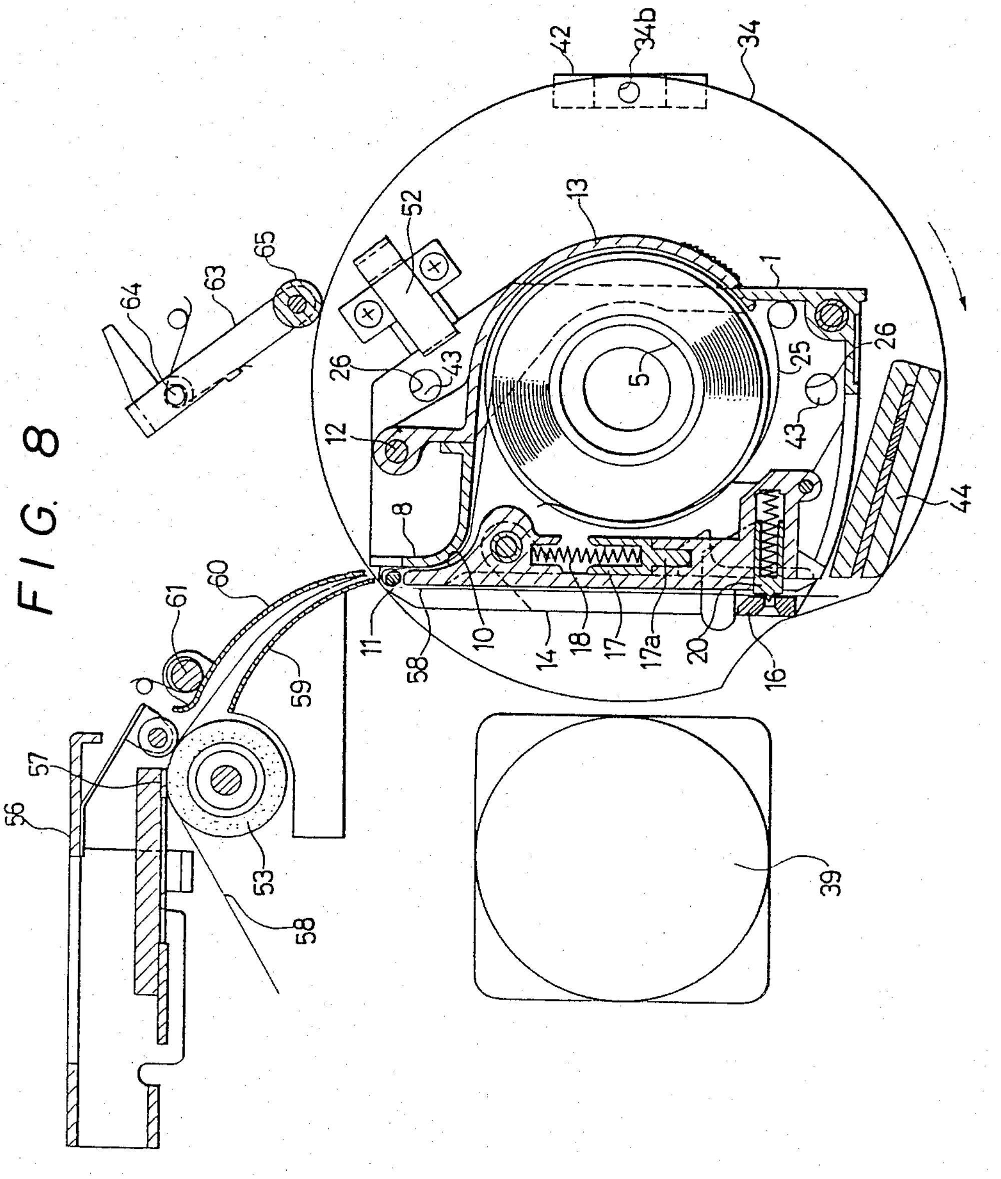

The position of the turntable 34 after it has completed one revolution and has stopped in its initial position is shown in FIG. 8. At this time the moving guide plate 60 is released from the tension of the label web 58 so that it resumes its initial position. After the label web 58 has been wound up and a predetermined length has been cut off the hook member 52 may be removed to disengage the cassette 1 from the turntable 34.

Figure 12:
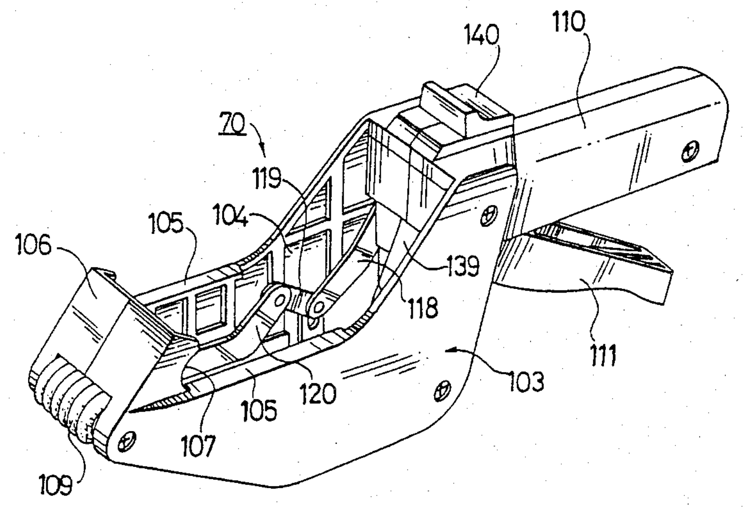
Figure 13:
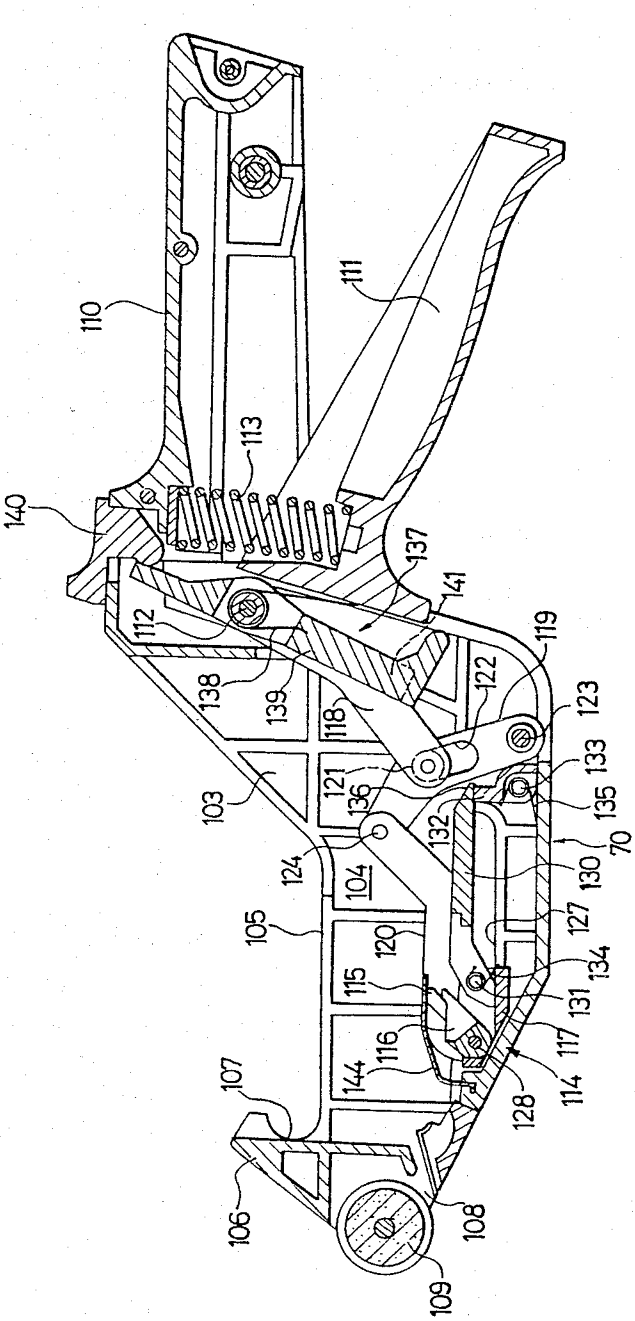

Turning to FIGS. 12, 13 and 14, a portable label applicator or hand labeler 70 will be described.

A labeler frame 103 defines an inner cassette space 104 for accommodating the cassette 1. Its upper edges slightly project inwardly in the horizontal direction to form a pair of shelves 105. The labeler frame 103 also has its front wall 106 formed with a pair of semicircular engagement notches 107. It also rotatably supports an applicator roller 109. A label exit opening 108 is formed below the roller 109 (FIG. 13).

In the lower portion of the labeler frame 103 there is located a feed mechanism 114 for feeding the label web 58. This feed mechanism 114 includes: a pawl member 116 which is formed with a pair of feed pawls 115 at its upper end; a holding frame 117 which holds the pawl member 116 and first second and third links 118 119 and 120 for moving the holding frame 117 back and forth. The first link 118 has one end fixed to the hand lever 111 and the other end carrying a roller 121 which is fitted in a slot 122 formed in the second link 119. The second link 119 has its lower end hinged by a pin 123, which is mounted laterally in the labeler frame 103, and its upper end is hinged at 124 to the third link 120. The third link 120 has its leading end fixed to the holding frame 117. The holding frame 117 has a generally C-shape as viewed from the top, as shown in FIG. 14, and its legs support two pairs of rollers 125 and 126. These rollers 125 and 126 are fitted in guide grooves 127 which are formed in the individual inner walls of the labeler frame 103. On the other hand the pawl member 116 is hinged to the holding frame 117 by means of a hinging pin 128 crossing the holding frame 117 and is always biased counter-clockwise, as viewed in FIG. 13, through the action of a spring 129. In front of the pawl member 116, there is located a backing paper retainer 144 (preferably a leaf spring) which is mounted in the labeler frame 103.

A lifting plate 130 is hinged to the rear end of the holding frame 117 by means of a hinging pin 131 anchored across the holding frame 117. Reference numeral 132 indicates a supporting member which is hinged to the labeler frame 103 by means of a hinging pin 133 anchored across the labeler frame 103. The lifting plate 130 and the supporting member 132 are biased by means of springs 134 and 135 respectively such that they are urged counter-clockwise and clockwise respectively as viewed in FIG. 13. In the non-actuated state the upper side of the supporting member 132 supports the lower side of the rear end of the lifting plate 130. Moreover, this lifting plate 130 has its upper side sloped at its rear end, as indicated at 136.

In the rear of the labeler frame 103 there is located a lock mechanism 137 for locking the cassette 1 into the frame 103. The lock mechanism 137 includes a lock member 139 which is hinged to the labeler frame 103 and biased clockwise by the action of a spring 138 and a hook button 140 which is attached longitudinally and slidably to the upper end of the rear portion of the labeler frame 103 such that its lower end abuts the lock member 139. As a result, the cassette 1 is locked into the frame 103 by bringing the lower end corner 141 of the lock member 139 into engagement with the engagement portion 142 (FIG. 3) of the lower end of the opening which is formed in the back of the cassette 1.

Figure 15:
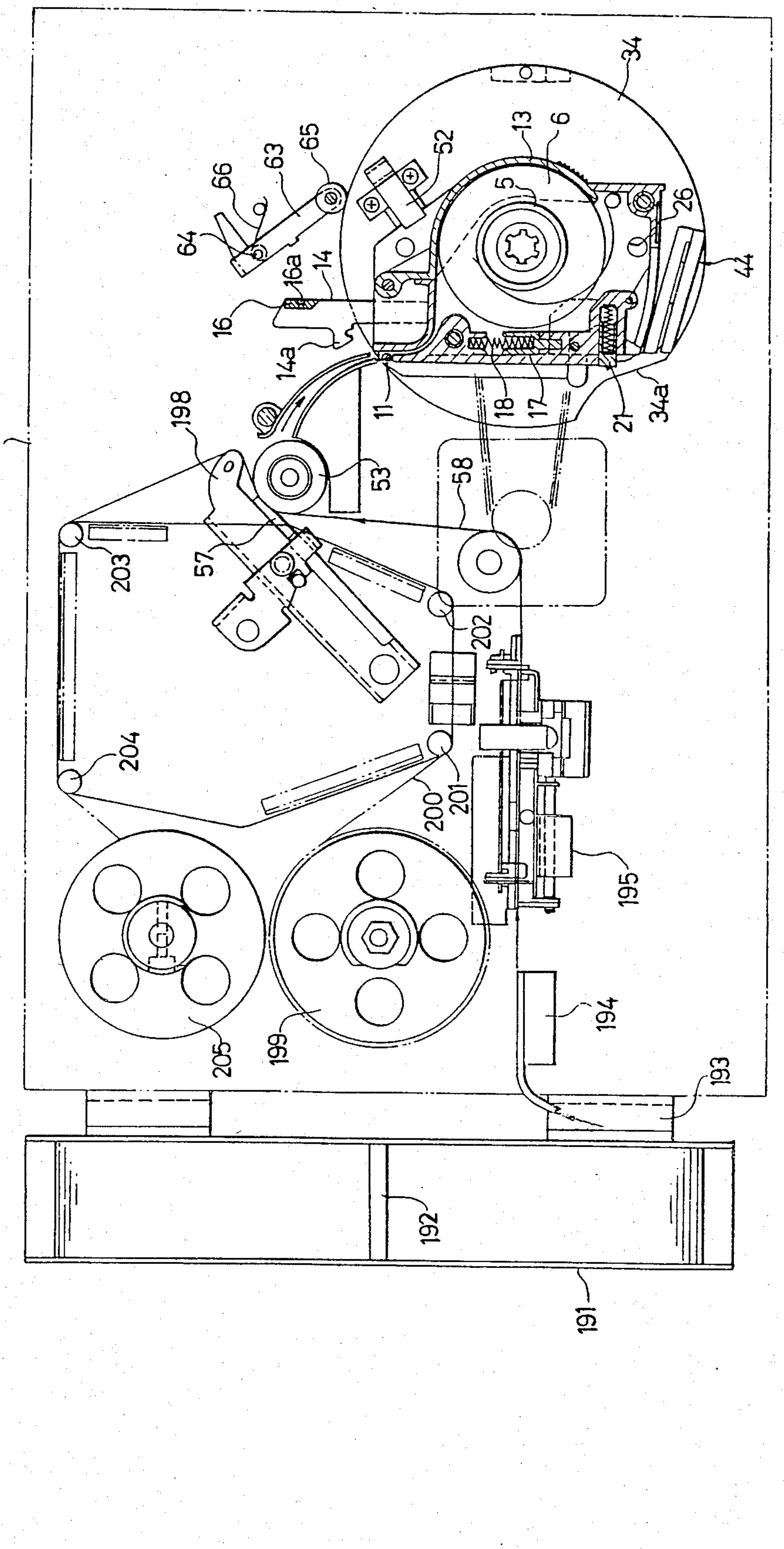
FIG. 15 is a top plane view showing a printer which is adapted to be used with the automatic label winder of the present invention.

The printer itself is constructed as shown in FIG. 15. In FIG. 15 the known portions such as the keyboard or the display are omitted, and only the printing unit and the winding unit are shown.

The base frame of the printer is generally indicated by reference numeral 27. To one side of the base frame 27 (i.e. to the lefthand side of the drawing) there is rotatably and removably attached through a reel shaft 192 a reel 191 which is wound with an unprinted label web 58. The label web 58 is fed from the reel 191 and is turned at a right angle by guides 193 and 194 so that it is in an upright position with respect to the base frame 27 when it is guided above the base frame 27. The label web 58 having passed through the guide 194 runs through a position detecting mechanism 195, whereupon its position is detected by detecting means such as a photo sensor. The label the position of which has been detected by the position detecting mechanism 195 is threaded into the passage between the heat transfer recording head 57 and the platen 53 which comprise the thermal printer. The recording head 57 is attached to the free end of an arm 198 and is urged into contact with the platen 53 by the action of a spring.

A let-off reel 199 is wound with the heat transfer ink ribbon 200 which is guided from the reel 199 to the recording head 57 by guide rollers 201 and 202 which cause the ribbon 200 to run side by side with the unprinted label web 58 so that the predetermined bar codes or the like are transferred to the labels by the action of the recording head 57. After the ink ribbon 200 has been used it is guided by guide pins 203 and 204 to a take-up reel 205 which is positioned near reel 199. On the other hand the label web 58 (to which the labels having the transferred bar codes are adhered) is moved forward by the action of platen 53 and is guided into the cassette 1 which is removably mounted on the base frame 190 as has been described above.

Thus, according to the present invention it is possible to provide an automatic label winder which is capable of automatically winding up a label web of a predetermined length upon the cassette mounted on a turntable.

The automatic label winder of the present invention is preferably combined with the printer so that its efficiency can be markedly improved.

Since the mechanisms are made remarkably simple the automatic label winder can be produced at a low cost without requiring any complicated control circuits or devices.

Although the present invention has been described in connection with preferred embodiments thereof many variations and modifications will now become apparent to those skilled in the art. It is preferred, therefore that the present invention be limited not by the specific disclosure herein but only by the appended claims.

What is claimed is:

1. An automatic label web winder for automatically winding a label web having printing labels upon the take-up core of a label cassette, said winder comprising:
- a rotatable turntable;
- means for relasably securing a label cassette to said turntable in such manner that said label cassette rotates with said turntable when it is secured thereto;
- means for guiding a label web into said cassette when said cassette is secured to said turntable;
- means for rotating a take-up core of said cassette when said cassette is secured to said turntable and after said label web has been guided into said cassette;
- means for rotating said turntable after said label web has been wound about said core; and
- means responsive to said rotation of said turntable for cutting said label web.

2. The automatic label web of claim 1 further including means for generating a stopping signal when said turntable assumes a predetermined angular orientation said means for rotating stopping the rotation of said turntable in response to said stopping signal.

3. The automatic label winder of claim 2 wherein said stopping signal generating means includes a detector for detecting the angular orientation of said turntable.

4. The automatic label web winder of claim 1, wherein said means for cutting said label web comprises:
- a blade casing;
- a movable blade having a cutting edge said blade being movable between a first postion wherein said cutting edge is inside said casing and a second position wherein said cutting edge is outside said casing;
- moving means for normally maintaining said blade in said first position and for moving said blade into said second position when said turntable approaches a predetermined angular orientation at which said blade cuts said web.

5. The automatic label web winder of claim 4 further including a base on which said turntable is rotatably mounted said moving means including a cam follower coupled to said blade and movable along a cam surface formed on said base as said turntable rotated, said cam surface causing said cam follower to move said blade into said second position when said turntable approaches said predetermined angular orientation.

6. The automatic label web winder of claim 5 wherein said moving means further includes a spring for biasing said blade into said first position.

7. The automatic label web winder of claim 1 wherein said means for rotating said core of said cassette comprises:

a winding shaft extending parallel to the axis of rotation of said turntable said winding shaft adapted to engage said core when said cassette is secured to said turntable; and means for rotating said winding shaft a predetermined number of revolutions.

8. The automatic label web winder of claim 7, wherein said winding shaft is coaxial with said axis of rotation of said turntable.

9. The automatic label web winder of claim 1 further comprising:

a base on which said turntable is rotatably mounted;

a cam surface formed along the outer periphery of said turntable, said cam surface including a notched section which lies closer to the axis of rotation of said turntable than the remainder of said cam surface and a cam follower coupled to said base and biased into contact with said cam surface said cam follower including a portion which extends above said turntable on the side of said turntable to which said cassette may be secured.

10. The automatic label web winder of claim 9 wherein said cam follower comprises:

an arm which is pivotally connected to said base;

a roller rotatably coupled to said arm; and means for biasing said roller into contact with said cam surface.

11. An automatic label web winder comprising:

(A) a rotatable turntable;

(B) a label cassette coupled to said turntable and rotatable therewith, said cassette including a take-up core on which said label web may be wound and (C) means for carrying out a web winding operation further comprising:

(1) means for feeding said label web into said cassette and into contact with said take-up core (2) means for rotating said take-up core to wind a predetermined length of said web around said core;

(3) means for rotating said turntable after said predetermined length of web has been wound around said core; and (4) means for both locking said web onto said cassette and cutting said web in response to said rotation of said turntable.

12. The automatic label web winder of claim 11, wherein said means for rotating said turntable a single revolution during said web winding operation.

13. The automatic label web winder of claim 12 wherein said means for rotating said turntable includes:

a sensor for generating a stopping signal when said turntable is at a predetermined angular position; and motor means for rotating said turntable from a time after said predetermined length of web has been wound around said core until said sensor generates said stopping signal.

14. The automatic label web winder of a claim 11 wherein said cutting means for cutting said label web in response to said rotation of said turntable comprises:

a blade casing a movable blade having a cutting edge said blade being movable between a first postion wherein said cutting edge is inside said casing and a second position wherein said cutting edge is outside said casing and moving means for normally maintaining said blade in said first postion and for moving said blade into said second position when said turntable approaches a predetermined angular orientation at which said blade cuts said web.

15. The automatic label web winder fo claim 14, further including a base on which said tuntable is rotatably mounted said moving means including a cam follower coupled to said blade and movable along a cam surface formed on said base as said turntable rotates, said cam surface causing said cam follower to move said blade into said second position when said turntable approaches said predetermined angular orientation.

16. The automatic label web winder of claim 15, wherein said moving means further includes a spring for biasing said blade into said first position.

17. The automatic label web winder of claim 11, wherein said means for rotating said core of said cassette comprises:

a winding shaft extending parallel to the axis of rotation of said turntable, said winding shaft adapted to engage said core when said cassette is secured to said turntable; and means for rotating said winding shaft a predetermined number of revolutions.

18. The automatic label web winder of claim 17 wherein said winding shaft is coaxial with said axis of rotation of said turntable.

19. The automatic label web winder of claim 11 wherein said cassette includes a locking member moveable between an open position in which said web is free to move relative to said cassette and a closed position in which said web is locked in position with respect to said cassette and wherein said means includes means for moving said locking member from said opened to said closed position in response to said rotation of said turntable.

20. The automatic label web winder of claim 19 wherein said locking member cooperates with a backing paper holder forming part of said cassette to pinch said web and hold it in a locked position relative to said cassette.

21. The automatic label web winder of claim 20 wherein said backing paper holder includes sharp point which is biased into said locking member when said locking member is in said closed position.

22. The automatic label web winder of claim 19 wherein said locking member comprising a swing arm which is pivotally coupled to said cassette.

23. The automatic label web winder of claim 19 wherein said moving means comprises:

a cam surface on said turntable said cam surface including a notched section which lies closer to the axis of rotation of said turntable than the remainder of said cam surface; and a cam follower riding on said cam surface and biased into contact with cam surface said cam follower including a portion which contacts said locking member as said turntable rotates, said cam follower moving said locking member into said closed position when said cam follower moves into said notched section of said cam surface.

* * * * *

United States Patent [19]

Euteneuer et al.

[11] Patent Number: 4,534,519

[45] Date of Patent: Aug. 13, 1985

[54] PHOTOGRAPHIC PAPER ROLL CORE HOLDING DEVICE

[75] Inventors: Charles L. Euteneuer, St. Michael; Robert E. Diesch, Rogers, both of Minn.

[73] Assignee: Pako Corporation, Minneapolis, Minn.

[21] Appl. No.: 464,962

[22] Filed: Feb. 8, 1983

[51] Int. Cl.[3] ....................... B65H 19/02; B65H 75/24

[52] U.S. Cl. ................................. 242/68.3; 242/72 R

[58] Field of Search .................. 242/68.3, 72 R, 72 B, 242/72.1; 269/48.1, 48.2, 48.3, 48.4; 279/2 R, 2 A

[56] References Cited

U.S. PATENT DOCUMENTS

| | | | |
|---|---|---|---|
| 3,000,582 | 9/1961 | Brede | 242/68.3 X |
| 3,278,133 | 10/1966 | Froehlich | 242/68.3 |
| 3,356,310 | 12/1967 | Yokota | 242/68.3 |
| 3,606,188 | 9/1971 | Wagner | 242/68.3 |
| 3,724,772 | 4/1973 | Hager et al. | 242/68.3 |
| 3,825,203 | 7/1974 | Kjos et al. | 242/68.3 |
| 4,422,590 | 12/1983 | Rathbone | 242/68.3 |

*Primary Examiner*—Harvey C. Hornsby

*Assistant Examiner*—Scott J. Haugland

*Attorney, Agent, or Firm*—Kinney & Lange

[57] ABSTRACT

A holding device for securing a photographic paper roll core concentrically about a rotatable shaft has a resilient clamping ring positioned concentrically about the shaft. An annular shoulder is fixed on the shaft on one side of the resilient clamping ring and a cylindrical compression sleeve is positioned concentrically about the shaft on the other side of the resilient clamping ring with the cylindrical compression sleeve being movable in axial direction along the shaft. A spring bias apparatus normally urges the cylindrical compression sleeve away from the shoulder so that the resilient clamping ring is in a first radially retracted position. The holding device has a lever-actuated cam assembly for urging the cylindrical compression sleeve toward the shoulder upon actuation of the cam assembly. In so doing, the cam assembly overcomes the urging of the spring bias means so that the resilient clamping ring is deformed between the cylindrical compression sleeve and the shoulder into a second radially-extended position in which the resilient clamping ring engages an inner radial surface of the paper roll core to secure the paper roll core for rotation with the shaft.

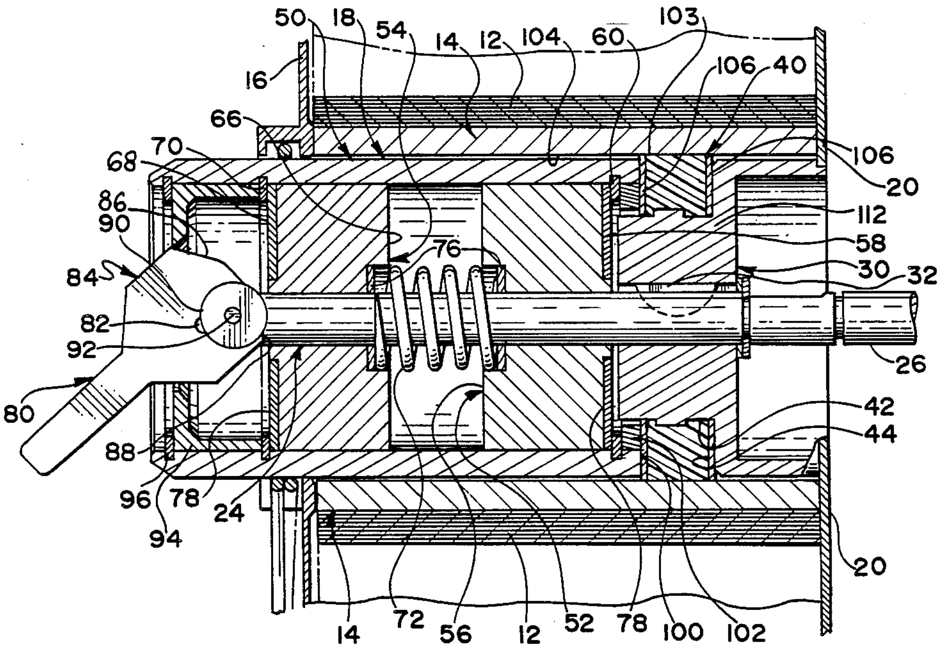

10 Claims, 4 Drawing Figures